United States Patent
Kuscher et al.

(10) Patent No.: US 9,310,988 B2
(45) Date of Patent: Apr. 12, 2016

(54) SCROLL END EFFECTS FOR WEBSITES AND CONTENT

(71) Applicant: Google Inc., Mountain View, CA (US)

(72) Inventors: Alexander Friedrich Kuscher, San Francisco, CA (US); Roma Rajni Shah, San Francisco, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 14/046,704

(22) Filed: Oct. 4, 2013

(65) Prior Publication Data

US 2015/0074592 A1 Mar. 12, 2015

Related U.S. Application Data

(60) Provisional application No. 61/876,155, filed on Sep. 10, 2013.

(51) Int. Cl.
*G06F 3/0485* (2013.01)

(52) U.S. Cl.
CPC .................... *G06F 3/0485* (2013.01)

(58) Field of Classification Search
CPC .................................................. G06F 3/0485
USPC ......................................................... 715/784
See application file for complete search history.

(56) References Cited

U.S. PATENT DOCUMENTS

| | | | |
|---|---|---|---|
| 2008/0109750 A1 | 5/2008 | Lin-Hendel | |
| 2009/0073194 A1* | 3/2009 | Ording | 345/672 |
| 2009/0106688 A1 | 4/2009 | Keohane et al. | |
| 2010/0199180 A1* | 8/2010 | Brichter | G06F 3/0482 715/702 |
| 2011/0010659 A1 | 1/2011 | Kim et al. | |
| 2011/0107264 A1* | 5/2011 | Akella | 715/830 |
| 2011/0202859 A1 | 8/2011 | Fong | |
| 2012/0278754 A1* | 11/2012 | Lehmann | G09G 5/34 715/784 |

FOREIGN PATENT DOCUMENTS

WO WO-2011/059556 A1 5/2011

OTHER PUBLICATIONS

Chucker23n. IPhone rubber band scrolling. (Oct. 21, 2010). Retrieved Jun. 22, 2015, from https://www.youtube.com/watch?v=UjuNGpU29Mk.*

* cited by examiner

*Primary Examiner* — Matt Kim
*Assistant Examiner* — David Luu
(74) *Attorney, Agent, or Firm* — McDermott Will & Emery LLP

(57) ABSTRACT

A system and machine-implemented method for providing a visual cue of overscrolling displayed content on an electronic device. When the end of a scrollable page or content has been reached, the visual cue corresponds to the user's physical scrolling input. The content in the window is effectively attached to the window so that when the end of the content is reached in one direction, the window containing the content is pulled in the same scrolling direction. The pulling in the scrolling direction occurs in a logarithmically decreasing manner, providing a tactile-like visual effect that the outer frame of the window is resisting the attempt to scroll further in the scrolling direction. The visual resistance effect may include squishing or stretching portions of the window without distorting the content within the window.

20 Claims, 5 Drawing Sheets

SCROLL END EFFECTS FOR WEBSITES AND CONTENT

CROSS-REFERENCE TO RELATED APPLICATIONS

The present application claims the benefit of priority under 35 U.S.C. §119 from U.S. Provisional Patent Application Ser. No. 61/876,155, filed on Sep. 10, 2013, the disclosure of which is hereby incorporated by reference in its entirety for all purposes.

BACKGROUND

The present disclosure generally relates to scroll end effects and, in particular, to provide for a tactile-like user experience of visually showing the end of a scrollable page or piece of content has been reached.

A website or content window may be scrollable up and down, as well as side to side. When an endpoint in one direction of the web page or content in the window is reached, the window may stop scrolling with the visible content remaining static as the only visual cue that the web page or content cannot scroll any further in a particular direction. Providing a further visual cue that the end of the content has been reached may be a more interesting and effective experience for a user.

SUMMARY

The disclosed subject matter relates to a computer-implemented method of providing a visual cue of overscrolling displayed content. The method includes displaying, on a device display, a window having a window control portion, a browser control portion and a content portion, wherein the content is scrollable. The method also includes determining that the displayed scrollable content is scrolled to an endpoint in a first direction. The method further includes receiving a user input to scroll the scrollable content further in the first direction. The method also includes displaying a visual cue that the user input is attempting to exceed the endpoint of the scrollable content, wherein the visual cue comprises moving the browser control portion and the content portion in a second direction.

The disclosed subject matter also relates to a system for providing a visual cue of overscrolling displayed content. The system includes one or more processors and a machine readable medium comprising instructions stored therein, which when executed by the processors, cause the processors to perform operations. The operations include displaying, on a device display, a window having a window control portion, a browser control portion and a content portion, wherein the content is scrollable. The operations also include determining that the displayed scrollable content is scrolled to an endpoint in a first direction. The operations further include receiving a user input to scroll the scrollable content further in the first direction. The operations also include displaying a visual cue that the user input is attempting to exceed the endpoint of the scrollable content, wherein the visual cue comprises moving the browser control portion and the content portion in a second direction, the second direction being opposite the first direction.

The disclosed subject matter also relates to a non-transitory machine-readable storage medium comprising machine readable instructions for causing a processor to execute a method for providing a visual cue of overscrolling displayed content. The method includes displaying, on a device display, a window having a window control portion, a browser control portion and a content portion, wherein the content is scrollable. The method also includes determining that the displayed scrollable content is scrolled to an endpoint in a first direction. The method further includes receiving a user input to scroll the scrollable content further in the first direction. The method also includes displaying a visual cue that the user input is attempting to exceed the endpoint of the scrollable content, wherein the visual cue comprises keeping the window control portion static and moving the browser control portion and the content portion in a second direction on a logarithmically decreasing basis.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
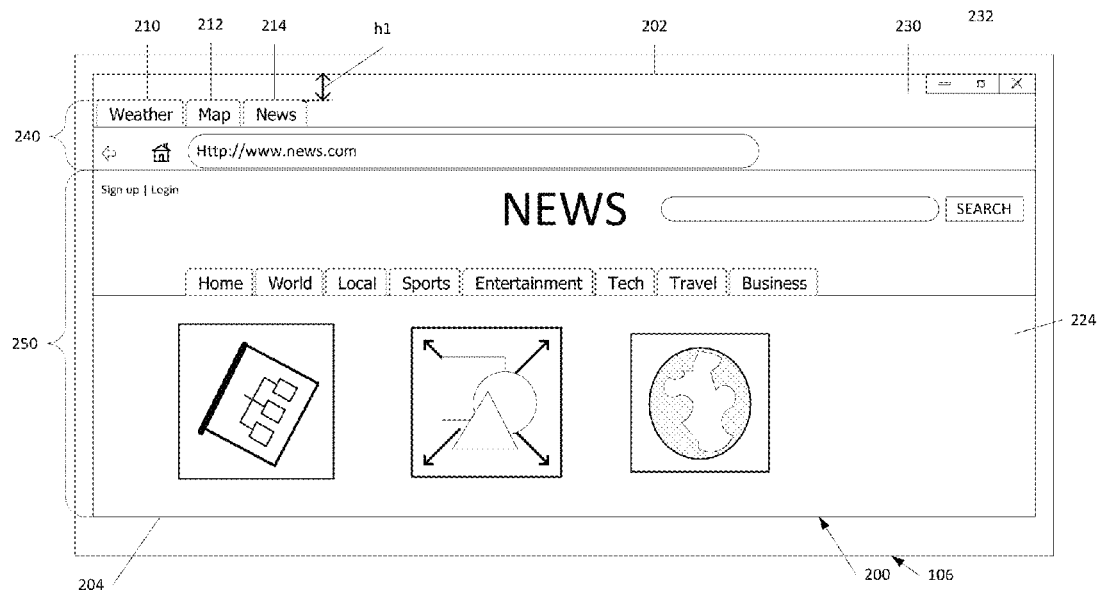
FIG. 1 illustrates an example of a browser window displaying the beginning content of a web page.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, structures and components are shown in block diagram form in order to avoid obscuring concepts of the subject technology.

As noted above, a user may attempt to overscroll a web page or content in a direction past an end point for the content.

For example, a user may navigate to a news website and scroll through the news content until reaching the last news story at the bottom of the web page. The user may continue to scroll in the same direction looking for more content, not realizing that the bottom of the web page has been reached just because the content remains static as the user overscrolls in the same direction. The web page or content may have beginning point at the top of the page, an end point at the bottom of the page, a leftmost point on the left side of the page and a rightmost point on the right side of the page. The user may attempt to overscroll the web page or content past the endpoint in any of the upward, downward, leftward or rightward directions.

One problem with such a static display of the content when overscrolling an endpoint in a particular direction of a web page or content is that the user may not readily see that the content endpoint has been reached. For example, a user may slowly scroll down a company web page displayed on the user's electronic device as the user reads the content displayed on the company web page. However, if the user reaches the bottom of the company web page and continues to try and scroll down in the company web page, the user may not readily pick up on a change from the web page content slowly moving upwards to ceasing to move any more. Further, the static display of web page content provides no visual indication corresponding to the amount of the user's overscrolling gestures. Thus, the user may continue to overscroll the web page past the end point trying to see additional web page content and becoming frustrated in the process.

The subject disclosure provides for displaying a visual cue that the user has begun to overscroll a web page or content in a particular direction. The visual cue may begin as soon as an overscrolling input is detected and the visual cue may intensify the visual motion of at least a portion of the content window as the overscrolling input continues. The visual motion may provide a tactile-like visual experience to the user that corresponds to the user's scrolling gestures. For example, the user may move a computer mouse in a direction that scrolls a web based article up to the beginning of the article. In response to the user continuing to move the mouse further in the same direction after the beginning of the article has been reached, a portion of the browser window displaying the article and a website toolbar showing the open browser tabs may shift further up while a portion of the browser window showing a window control toolbar may remain fixed, thereby squishing the content and tab toolbar upwards into the control toolbar. Thus, the visual cue of squishing the content and tab toolbar in the browser window may provide a tactile-like visual sensation that the browser window is resisting the user's attempt to overscroll the content.

FIG. 1 illustrates an example of a browser window 200 displayed on a tablet computer 106. Browser window 200 includes a window control portion 230 having a tool bar with browser window controls 232 (e.g., close, minimize, maximize). Browser window 200 also includes a browser control portion 240 having tabs 210, 212, 214 indicating current open tab based activities. In the example of FIG. 1, tabs 210 and 212 indicate browser activities (e.g., search, website navigation, internet application) that a user has previously opened or initiated. Tab 214 indicates the most recent/current browser activity, which is further indicated by content 224 in a content portion 250 of the browser window 200. For example, tab 214 is an internet search of a news website and content 224 is the home page of the news website. Tabs 210 and 212 also have corresponding content 220 and 222 that are hidden while content 224 is displayed. If the user selects either tab 210 or 212, the corresponding content 220 or 222 is then displayed and content 224 is hidden.

Content 224 is scrollable up and down in content portion 250. For example, as illustrated in FIG. 1, content 224 is the home page of a news website. The beginning of content 224 includes the news website logo and multiple tabs indicating various categories of news items. Further down the web page are various news stories that continue beyond the window displayed on the screen such that the user has to scroll downwards to read additional stories in the news stream of content 224. The distance between the top of the tabs 210, 212, 214 and a top border 202 of browser window 200 is shown as height h1 in FIG. 1.

Figure 2:
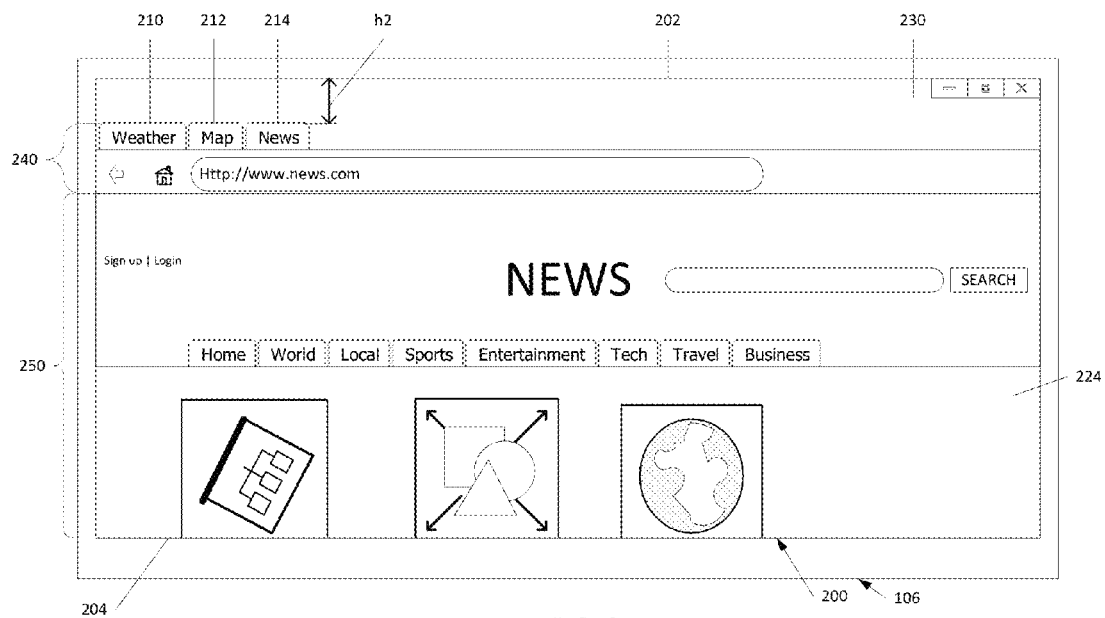
FIG. 2 illustrates an example of a visual cue in the browser window display corresponding to a user input to scroll further beyond the beginning content in the upward direction.

FIG. 2 illustrates an example of browser window 200 in which the user has attempted to scroll the content 224 further upwards past the beginning of the content 224 (e.g., overscrolling). For example, the user may put a finger on a touchscreen display and pull down on the screen to try to scroll to additional content 224 further upwards on the display. Here, the tablet computer 106 may be configured to scroll in the opposite direction as the finger is dragged on the touchscreen, so that as the finger is dragged down, the viewing point in the content 224 is scrolled up and the content 224 shifts downwards. Alternatively, the tablet computer 106 may be configured to scroll in the same direction as the finger motion, such that as the finger is dragged downwards on the screen, the viewing point in the content 224 is scrolled down such that the content 224 shifts upwards. In addition, the scrolling input may be a finger or object (e.g., pencil) dragged across a touchscreen or a trackpad, movement of a mouse, pressing keyboard arrows on a keyboard, and the like.

As illustrated in FIG. 2, when the user overscrolls past the beginning or top of the content 224, the browser control portion 240 and content portion 250 shift downwards within browser window 200. Here, the tabs 210, 212, 214 and the content 224 all shift downwards within browser window 200 while the window control portion 230 with the window controls 232 remains in place (e.g., static). The distance between the top of the tabs 210, 212, 214 and the top border 202 of browser window 200 is shown as height h2 in FIG. 2, where height h2 is greater than height h1. Accordingly, the window control portion 230 is expanded (e.g., stretched) in the top overscrolled position and the content portion 250 is compressed into a bottom border 204 of browser window 200. The content 224 and tabs 210, 212, 214 shown in FIG. 2 are not distorted, but instead are shifted downwards so that a number of bottom pixel rows of content 224 are occluded or covered by the bottom border 204.

The stretching of window control portion 230, the shifting of the browser control portion 240 and the compressing of content portion 250 may be done on a logarithmically decreasing basis or function. For example, as the user first begins to overscroll in the upwards direction past the beginning of the content 224, the downward shift of browser control portion 240 and content portion 250 may be the most pronounced, while continued overscrolling in the upwards direction causes the browser control portion 240 and content portion 250 to shift downwards in slighter increments until the browser control portion 240 and content portion 250 stop shifting downwards altogether. Such logarithmically decreasing shifting of browser control portion 240 and content portion 250 downwards, stretching window control portion 230 and compressing content portion 250, provides a tactile-like visual cue that the browser window 200 is resisting the user's attempt to overscroll the content 224.

Regardless of the amount the window control portion 230 stretches and the content portion 250 compresses, when the top overscrolling input ceases (e.g., the user lifts the finger or stops moving the mouse), the browser control portion 240 and content portion 250 shift back upwards the same amount that the browser control portion 240 and content portion 250 shifted downwards. Thus, the window control portion 230, the browser control portion 240 and the content portion 250 snap or bounce back to the original dimensions displayed at the start of the top overscrolling process. Here, the window control portion 230, browser control portion 240 and content portion 250 bounce back to the positions and dimensions shown in FIG. 1, where the distance between the top of the tabs 210, 212, 214 and the top border 202 is again height h1.

Figure 3:
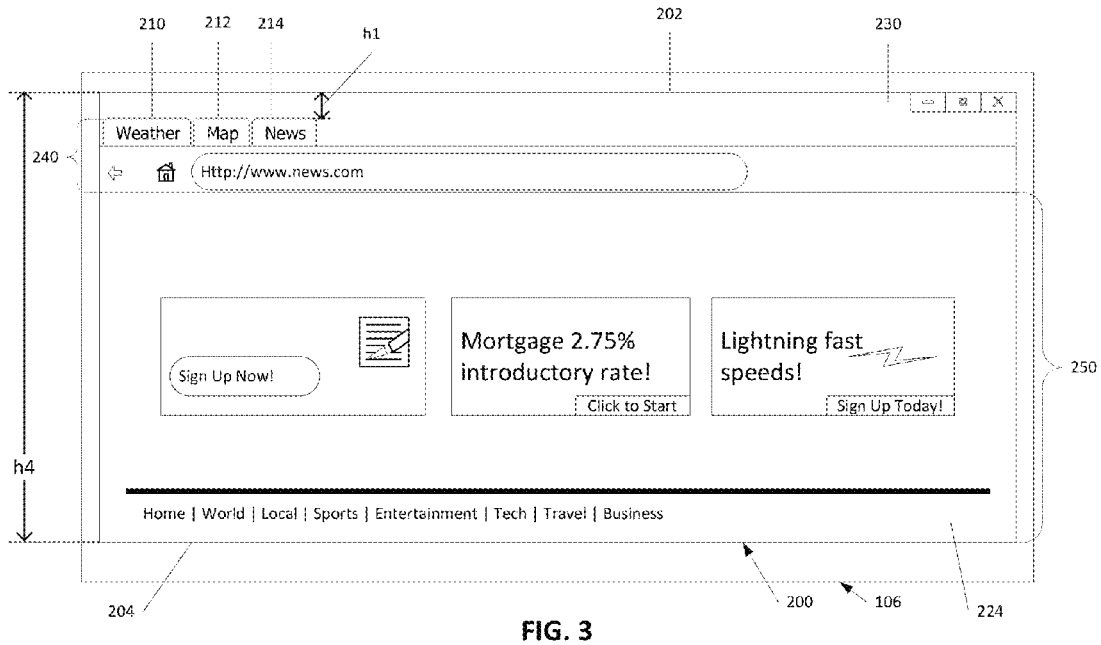
FIG. 3 illustrates an example of a browser window displaying the ending content of a web page.
Figure 4:
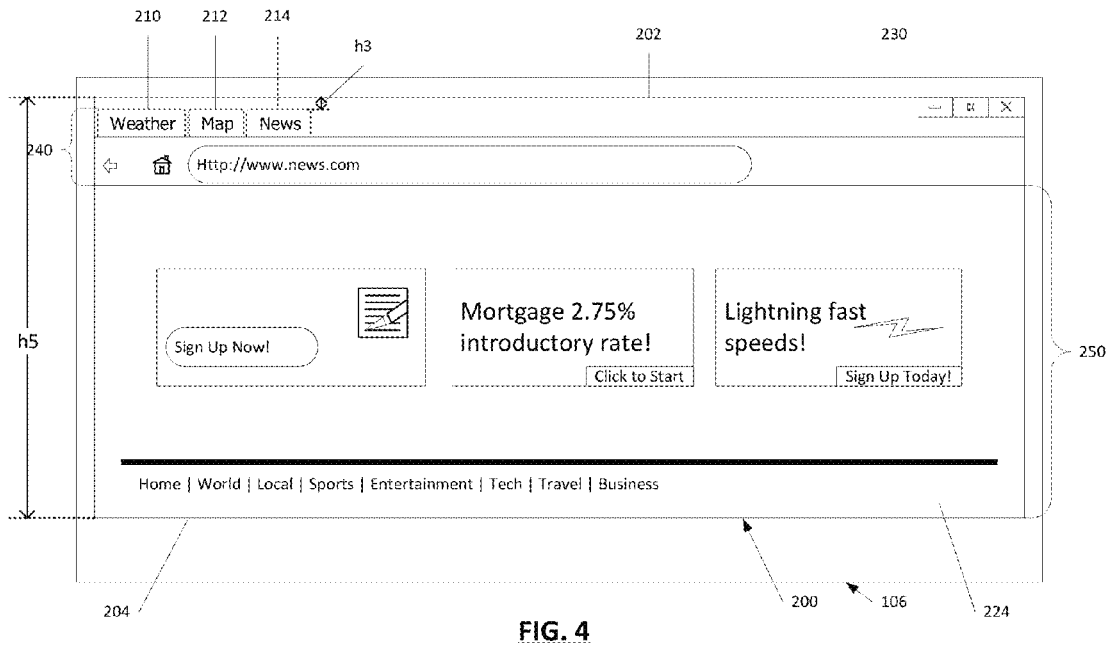
FIG. 4 illustrates an example of a visual cue in the browser window display corresponding to a user input to scroll further beyond the ending content in the downward direction.

FIGS. 3 and 4 illustrate an overscrolling process on the other (e.g., bottom) end of the news web page or content 224. The distance between the top of the tabs 210, 212, 214 and the top border 202 of browser window 200 is again height h1, as shown in FIG. 3. The window control portion 230, the browser control portion 240 and the content portion 250 may have similar dimensions when at the end of content 224 as discussed above when at the beginning of content 224. The end of content 224 may include the last news items on the news home web page, as well as advertisements and links to other areas of the news website.

FIG. 4 illustrates an example of browser window 200 in which the user attempts to overscroll the content 224 further downwards past the ending or bottom of the content 224. When the user overscrolls past the ending of the content 224, the browser control portion 240 and content portion 250 shift upwards within browser window 200. Here, the tabs 210, 212, 214 and the content 224 all shift upwards within browser window 200 while the window control portion 230 with the window controls 232 remains fixed. The distance between the top of the tabs 210, 212, 214 and the top border 202 browser window 200 is shown as height h3 in FIG. 4, where height h3 is smaller than height h1. Accordingly, the window control portion 230 is contracted (e.g., shrunk) in the bottom overscrolled position and the browser control portion 240 is moved into the window control portion 230. The content 224 and tabs 210, 212, 214 shown in FIG. 4 are not distorted, but instead are shifted upwards towards the top border 202. Here, the content portion 250 may be shifted upwards more than the browser control portion 240, where a number of top pixel rows of content 224 are occluded or covered by the bottom edge of the tab 214 (e.g., the bottom edge of a tab toolbar).

As further shown in FIG. 4, the bottom border 204 may also shift upwards during the bottom overscrolling process, shrinking the size of the browser window 200. As shown in FIG. 3, the distance between the top border 202 and the bottom border 204 is shown as height h4. As shown in FIG. 4, the distance between the top border 202 and the bottom border 204 has decreased and is shown as height h5. Alternatively to shifting the bottom border 204 upwards during the bottom overscrolling process, the bottom border 204 may remain fixed in place and the browser control portion 240, the control content portion 250, or both, may expand as the browser control portion 240 is shifted upwards into the window control portion 230.

Similarly as discussed above in the top overscrolling process, the shifting of any or all of the browser control portion 240, the content portion 250 and the bottom border 204 in the bottom overscrolling process may be done on a logarithmically decreasing basis. For example, the shifting of the browser control portion 240 may be done on a first logarithmically decreasing basis and the shifting of the content portion 250 may be done on a second logarithmically decreasing basis, thereby accounting for the difference in how much the browser control portion 240 and the content portion 250 are each shifted upwards. Thus, the browser control portion 240, the content portion 250 and the bottom border 204 may each shift upwards at a different rate, where any or all shifting rates may be on a logarithmically decreasing basis. In another aspect, the browser control portion 240 and the content portion 250 may each shift upwards at the same rate and may appear to shift upwards as one integrated portion.

Regardless of the amount the browser control portion 240 compresses into the window control portion 230, when the bottom overscrolling input ceases, the browser control portion 240 and the content portion 250 shift back downwards the same amount that the browser control portion 240 and the content portion 250 shifted upwards. Thus, the window control portion 230, the browser control portion 240 and the content portion 250 snap or bounce back to the original dimensions displayed at the start of the bottom overscrolling process. Here, the window control portion 230, browser control portion 240 and content portion 250 bounce back to the positions and dimensions shown in FIG. 3, where the distance between the top of the tabs 210, 212, 214 and the top border 202 is again height h1. In addition, if the bottom border 204 shifted upwards, then the bottom border 204 also bounces back after the bottom overscrolling input ceases. Thus, the browser window 200 returns to the dimension the browser window 200 had before the bottom overscrolling input was received, where the distance between the top border 202 and the bottom border 204 is again height h4.

Figure 5:
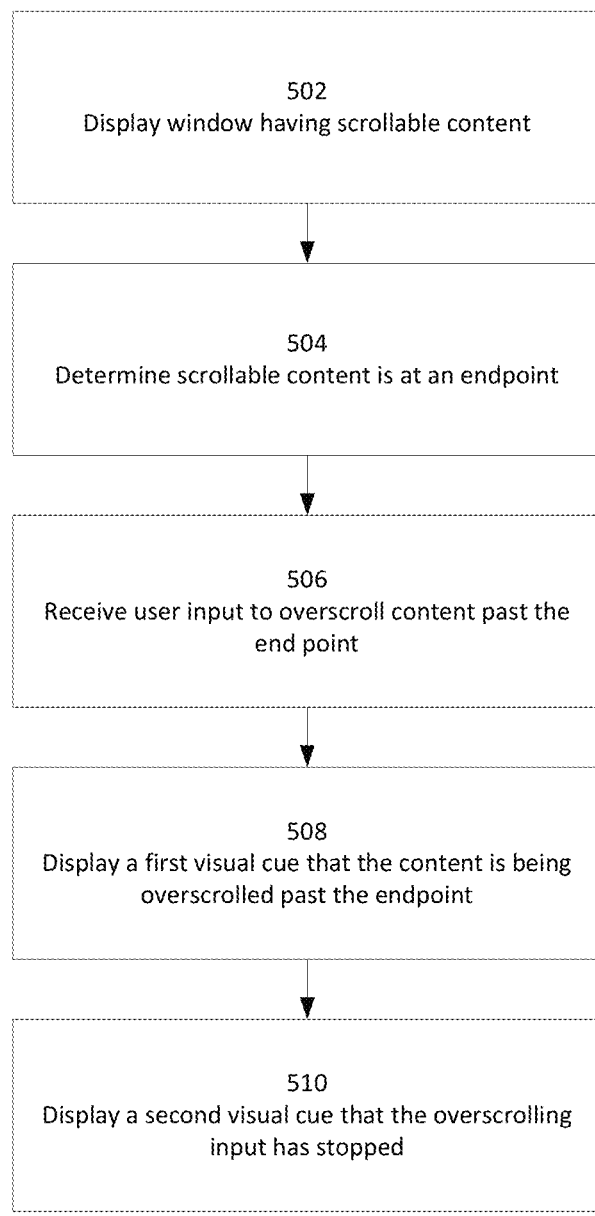
FIG. 5 illustrates an example process which provides for displaying a visual cue of overscrolling displayed content.

FIG. 5 illustrates an example process 500 which provides a visual cue of overscrolling displayed content. The process 500 begins in step 502 when a window having scrollable content is displayed on an electronic device. The scrollable content has a beginning endpoint (e.g., the top of the content) and an ending endpoint (e.g., the bottom of the content). The content may also be scrollable from side to side, in which case the scrollable content will also have a leftmost endpoint and a rightmost endpoint. The scrollable content may be a web page from a website, an article, a map, and the like. The electronic device determines that the scrollable content is at an endpoint at step 504. For example, it may be determined that the displayed content is currently scrolled to the beginning or top of the scrollable content. At step 506, a user input to scroll the content in a first direction past the determined endpoint of the scrollable content. For example, a user tries to scroll the content further past or in front of the beginning or top of the scrollable content.

At step 508, the electronic device displays a visual cue that the user is trying to exceed the endpoint of the scrollable content by overscrolling the scrollable content. The visual cue is a tactile-like visual presentation of the browser window that corresponds to the user's physical scrolling gestures or motions. For example, the top or window control portion of the browser window may be a browser window toolbar having window controls (e.g., close, minimize, maximize) that remains static while both a browser control portion (e.g., tabs, navigation bar) and a content portion (e.g., web page content) may move towards the static toolbar or away from the static toolbar depending on the direction of the overscrolling motion. The movement of the tabs and/or content may provide a visual impression of the window being squished (e.g., compressed) or stretched (e.g., expanded). In addition, a portion of the outer perimeter or border of the browser window may also move during the overscrolling process, thereby compressing or expanding the entire browser window.

The process ends at step 510 when the electronic device displays a second visual cue showing movement of the browser control portion and the content portion in another direction, indicating that the user's overscrolling input has stopped. The second visual cue may be a reversal of the first visual cue, such that the browser control portion and the content portion and/or the border of the browser window shift back to the original positions prior to the start of the overscrolling process. For example, the browser control portion and the content portion may shift up towards the window control portion during the overscrolling process and bounce back to the position the browser control portion and the content portion were in prior to shifting up. The second visual cue may be triggered by the cessation or removal of the overscrolling input. For example, the user may stop trying to scroll in the first direction after seeing the browser window squish, so that the electronic device is no longer receiving a scrolling input, whereupon the tabs and content of the browser window snap or bounce back to the top of the content.

The visual cue may include other visual presentations that the user is trying to overscroll the content. For example, the visual cue may include changing a portion of the browser window to a color where the color is based on the color of a specific pixel row in the scrollable content (e.g., the first or last pixel row). When overscrolling at the top of the content, as the browser control portion and the content portion of the browser window moves away from the static toolbar in step 508, the window control portion may remain static and an expanded area of the content portion changes color to match the color of the top pixel row of the content. In step 510, the browser control portion and the content portion bounce back to a pre-overscrolling position and the newly colored area disappears as the expanded area of the content portion is compressed. Similarly, when overscrolling at the bottom of the content, the content portion shifts upwards at the bottom of the window and the new area of the content portion that moves into view at the bottom of the window changes color to match the color of the bottom pixel row of the content. Again, the color disappears when the content portion bounces back to the pre-overscrolling position. Thus, the color visually appears and stretches out at the top or the bottom of the browser window, depending on the overscrolling direction. Also, the content portion bounces back when the overscrolling input stops, causing the changed color area of the browser window to disappear or become hidden.

As another example, the visual cue may include changing a portion of the browser window to match the wallpaper design of the display. For example, similar to the process of changing the color of an area of the browser window discussed above, the changed area of the browser window (e.g., the expanded or new area of the content portion) may show a wallpaper background matching the wallpaper design shown on the display instead of a particular color.

In yet another example, the visual cue may include compressing or expanding the entire browser window by shifting one or more browser window borders inwards or outwards. For example, the top border may be shifted upwards, the bottom border may be shifted downwards or both, thereby expanding the browser window to a larger size. As the browser window expands, the content within the browser window may expand as well, so that same content is displayed, but in larger form. Similarly, the top border may be shifted downwards, the bottom border may be shifted upwards or both, thereby shrinking or compressing the browser window to a smaller size. As the browser window shrinks, the content within the browser window may shrink as well, so that same content is displayed, but in smaller form. In addition, the left and right borders may shift inwards or outwards as well, for example. The browser window may also bounce back from the expanded or compressed state when the overscrolling input stops.

Figure 6:
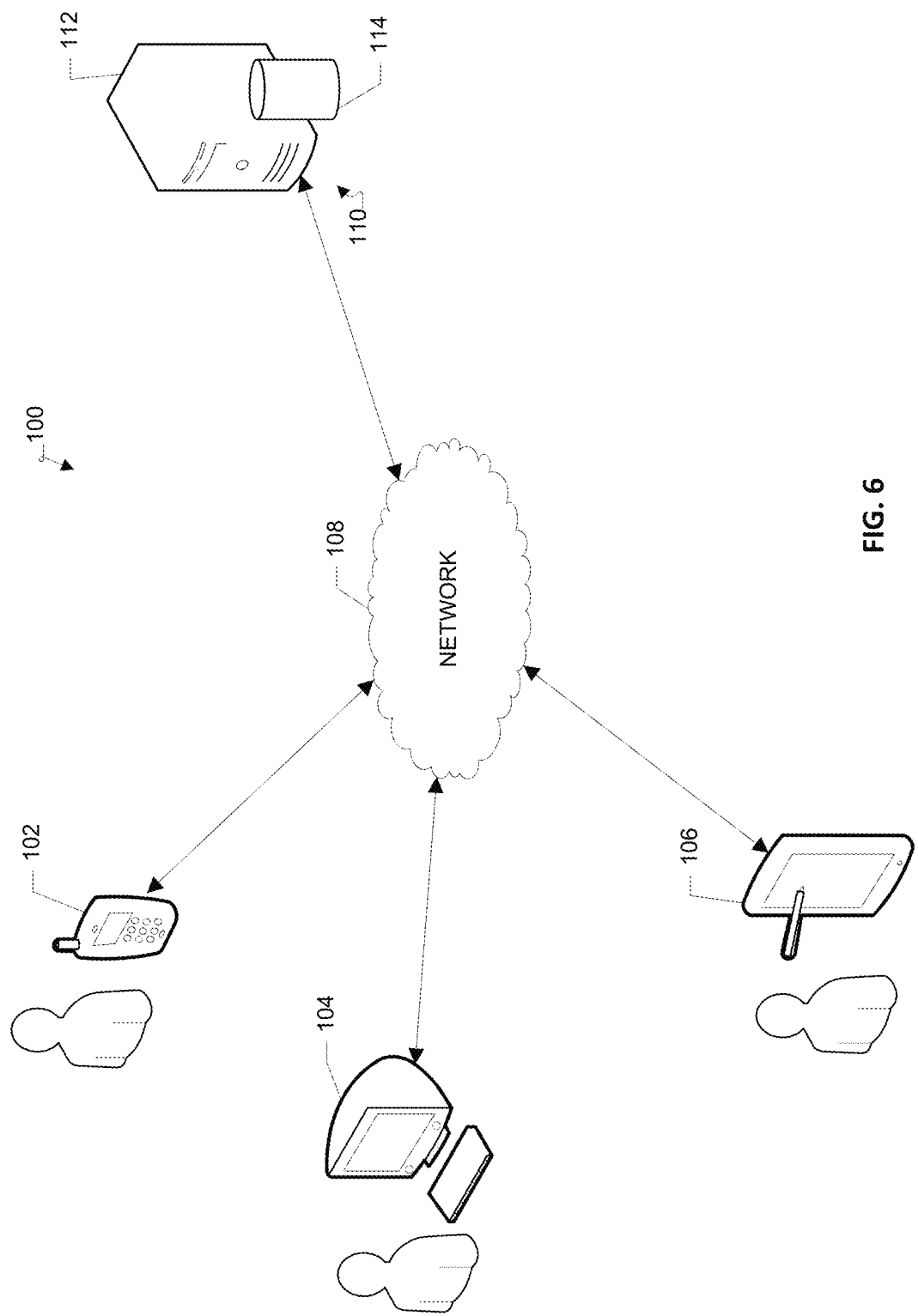
FIG. 6 illustrates an example network environment which can provide for displaying a visual cue of overscrolling displayed content.

FIG. 6 illustrates an example network environment which can provide for a visual cue of overscrolling a web page or content. A network environment 100 includes a number of electronic devices 102-106 communicably connected to a server 110 by a network 108. Each of electronic devices 102-106 can include a touchscreen or other user input device (e.g., mouse, keyboard), which can be built into the device itself or can be electronically connected to the device (e.g., as a peripheral device). Server 110 includes a processing device 112 and a data store 114. Processing device 112 executes computer instructions stored in data store 114, for example, to provide content (e.g., a website or other display content) to any of electronic devices 102-106.

Electronic devices 102-106 can be mobile devices (e.g., smartphones, tablet computers, PDAs, and laptop computers), portable media players, desktop computers or other appropriate computing devices. In the example of FIG. 6, electronic device 102 is depicted as a smartphone, electronic device 104 is depicted as a desktop computer, and electronic device 106 is depicted as a tablet computer.

In some example aspects, any of electronic devices 102-106 may obtain application data (e.g., web page data), and content (e.g., images, video, text, links) corresponding to the application data to be displayed on a display of the electronic device (e.g., 102-106). In some example aspects, the content can be transmitted from server 110 via the network 108 to the electronic devices 102-106. In other example aspects, the content can be stored in a storage component (e.g., hard disk, RAM, ROM, etc.) of the respective electronic devices 102-106.

Any of electronic devices 102-106 display a scrollable window having a web page or other content. The electronic device (e.g., any of 102-106) determines that a scrollable window has reached a scrolling end point in a particular direction, wherein there is no additional content to be displayed further in the particular direction. The electronic device further determines that a user is attempting to scroll the scrollable window further past the identified end point.

In response to the determination, the electronic device generates and displays a visual cue clearly indicating that the end point of the scrollable window has been reached. For example, an application (e.g., web browser) running on the electronic device may be open to scrollable web based content (e.g., a news web page) displaying a series of news headlines with corresponding web links to the full news story for each news headline. The electronic device may determine that a user is attempting to scroll the news web page further before the beginning point of the news web page content. The electronic device may visually show the news web page window squish upwards into the top of the browser window and then bounce back to the end point position displaying the beginning of the news web page. Server 110 may be any system or device having a processor, a memory, and communications capability for providing content to the electronic devices. In some example aspects, server 110 can be a single computing device such as a computer server. In other embodiments, server 110 can represent more than one computing device working together to perform the actions of a server computer (e.g., cloud computing).

Network 108 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 7:
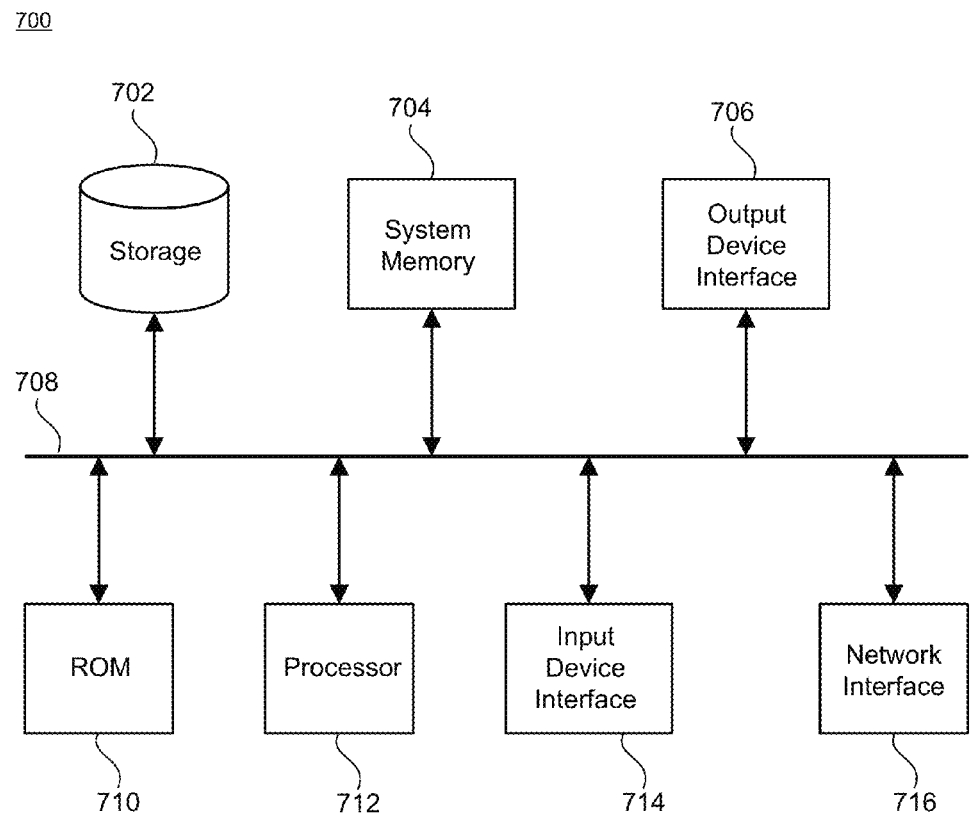
FIG. 7 conceptually illustrates an example electronic system with which some implementations of the subject technology can be implemented.

FIG. 7 conceptually illustrates an example electronic system with which some implementations of the subject technology can be implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 702.

Other implementations use a removable storage device (for example, a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, or ROM 710. For example, the various memory units include instructions for displaying an overscrolling visual cue in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, for example, liquid crystal displays (LCD). Some implementations include devices, for example, a touchscreen that functions as both input and output devices.

Further, as shown in FIG. 7, bus 708 also couples electronic system 700 to a network (not shown) through a network interface 716. In this manner, the computer can be a part of a network of computers (for example, a local area network ("LAN"), a wide area network ("WAN"), or an Intranet, or a network of networks, for example, the Internet. Any or all components of electronic system 700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of providing a visual cue of overscrolling displayed content, the method comprising:

displaying, on a device display, a window having a window control portion, a browser control portion and a content portion, wherein the content is scrollable;

determining that the displayed scrollable content is scrolled to an endpoint in a first direction;

receiving a user input to scroll the scrollable content further in the first direction;

displaying a visual cue that the user input is attempting to exceed the endpoint of the scrollable content, wherein the visual cue comprises moving the browser control portion and the content portion in a second direction, wherein browser control elements in the browser control portion and content in the content portion are shifted in the second direction without distortion;
if the second direction is towards the window control portion, the distance between the browser control elements and an outer border of the window control portion is decreased, wherein the visual cue further comprises contracting the window control portion, moving the browser control portion into the window control portion and expanding the content portion; and
if the second direction is away from the window control portion, the distance between the browser control elements and the outer border of the window control portion is increased.

2. The method of claim 1, wherein the second direction is opposite the first direction.

3. The method of claim 1, wherein the browser control portion and the content portion move in the second direction on a logarithmically decreasing basis.

4. The method of claim 1, wherein the browser control portion and the content portion move towards the window control portion, compressing the window control portion.

5. The method of claim 1, wherein the browser control portion and the content portion move away from the window control portion, stretching the window control portion.

6. The method of claim 4, wherein a bottom edge of the window moves towards the window control portion, compressing the window.

7. The method of claim 1, further comprising:
displaying a second visual cue, wherein the second visual cue comprises moving the browser control portion and the content portion in the first direction.

8. The method of claim 7, wherein the browser control portion and the content portion move the same distance in the first direction that the browser control portion and the content portion moved in the second direction.

9. The method of claim 1, wherein the visual cue further comprises changing a portion of the window to a color, wherein the color is based on the color of a pixel row of the scrollable content.

10. The method of claim 1, wherein the visual cue further comprises changing a portion of the window to match a wallpaper design displayed on the device display.

11. The method of claim 1, wherein if the second direction is away from the window control portion, the visual cue comprises expanding the window control portion, shifting the browser control portion and compressing the content portion.

12. The method of claim 11, wherein the visual cue further comprises moving a border of the window in the first direction, compressing the window.

13. The method of claim 1, wherein the visual cue further comprises expanding the browser control portion.

14. A system for providing a visual cue of overscrolling displayed content, the system comprising:
one or more processors; and
a non-transitory machine-readable medium comprising instructions stored therein, which when executed by the processors, cause the processors to perform operations comprising:
displaying, on a device display, a window having a window control portion, a browser control portion and a content portion, wherein the content is scrollable;
determining that the displayed scrollable content is scrolled to an endpoint in a first direction;
receiving a user input to scroll the scrollable content further in the first direction; and
displaying a visual cue that the user input is attempting to exceed the endpoint of the scrollable content, wherein the visual cue comprises moving the browser control portion and the content portion in a second direction, the second direction being opposite the first direction, wherein browser control elements in the browser control portion and content in the content portion are shifted in the second direction without distortion;
if the second direction is towards the window control portion, the distance between the browser control elements and an outer border of the window control portion is decreased, wherein the visual cue further comprises contracting the window control portion, moving the browser control portion into the window control portion and expanding the content portion; and
if the second direction is away from the window control portion, the distance between the browser control elements and the outer border of the window control portion is increased.

15. The system of claim 14, wherein the browser control portion and the content portion each move in the second direction on a different logarithmically decreasing basis.

16. The system of claim 14, wherein the browser control portion and the content portion move towards the window control portion, compressing the window control portion.

17. The system of claim 14, wherein the browser control portion and the content portion move away from the window control portion, stretching the window control portion.

18. The system of claim 14, further comprising:
displaying a second visual cue, wherein the second visual cue comprises moving the browser control portion and the content portion the same distance in the first direction that the browser control portion and the content portion moved in the second direction.

19. A non-transitory machine-readable storage medium comprising machine readable instructions for causing a processor to execute a method for providing a visual cue of overscrolling displayed content, the method comprising:
displaying, on a device display, a window having a window control portion, a browser control portion and a content portion, wherein the content is scrollable;
determining that the displayed scrollable content is scrolled to an endpoint in a first direction;
receiving a user input to scroll the scrollable content further in the first direction;
displaying a visual cue that the user input is attempting to exceed the endpoint of the scrollable content, wherein the visual cue comprises keeping the window control portion static and moving the browser control portion and the content portion in a second direction, wherein browser control elements in the browser control portion and content in the content portion are shifted in the second direction without distortion;
if the second direction is towards the window control portion, the distance between the browser control elements and an outer border of the window control portion is decreased, wherein the visual cue further comprises contracting the window control portion, moving the browser control portion into the window control portion and expanding the content portion; and
if the second direction is away from the window control portion, the distance between the browser control elements and the outer border of the window control portion is increased.

20. The non-transitory machine-readable storage medium of claim 19, wherein the visual cue further comprises expanding the browser control portion.

\* \* \* \* \*